Aug. 16, 1966  G. H. SHERIDAN  3,266,173
TRAINING APPARATUS
Original Filed March 19, 1962  7 Sheets-Sheet 6
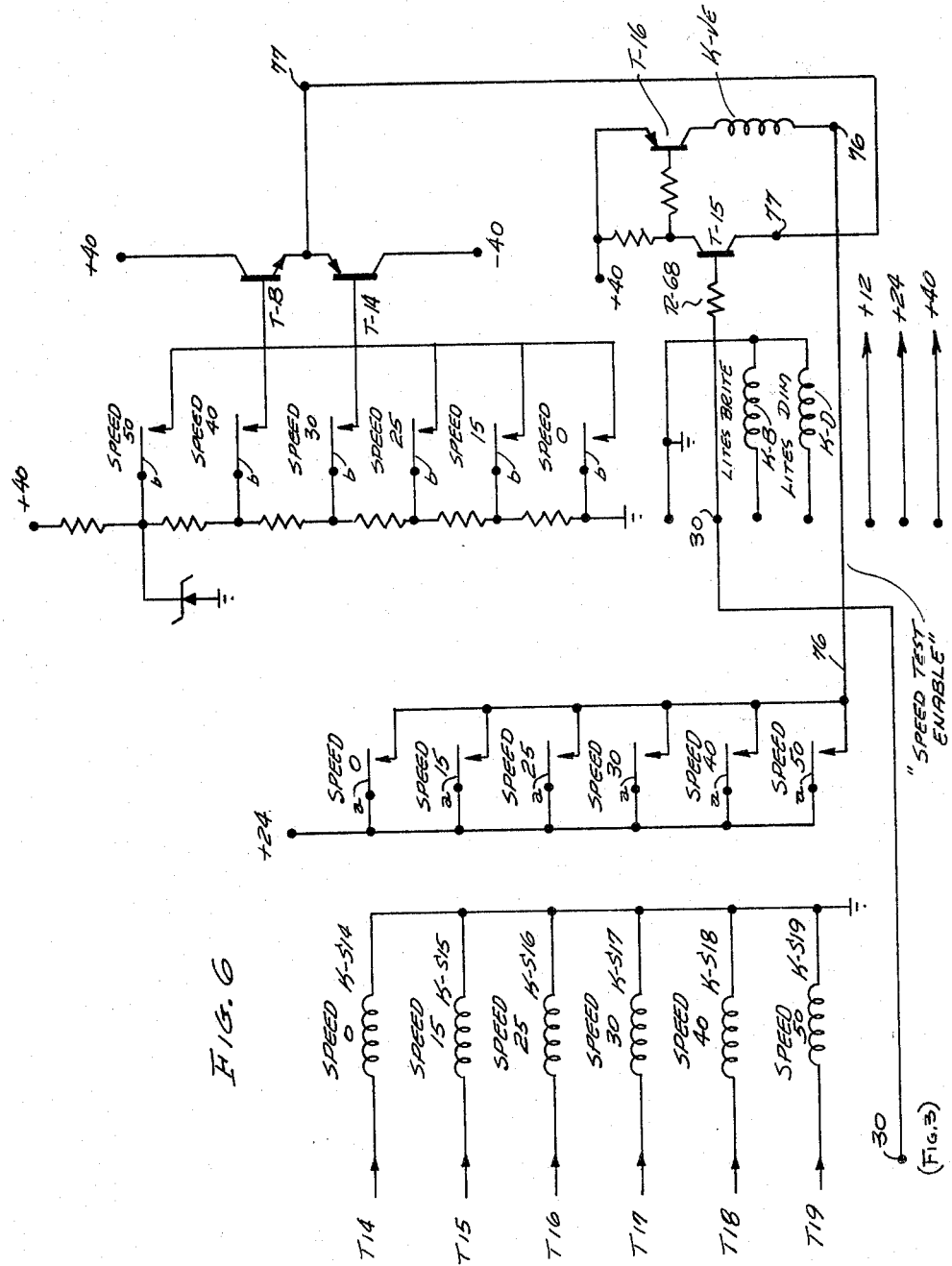
GENE H. SHERIDAN
INVENTOR
BY *Richard L. Stephens*
ATTORNEY

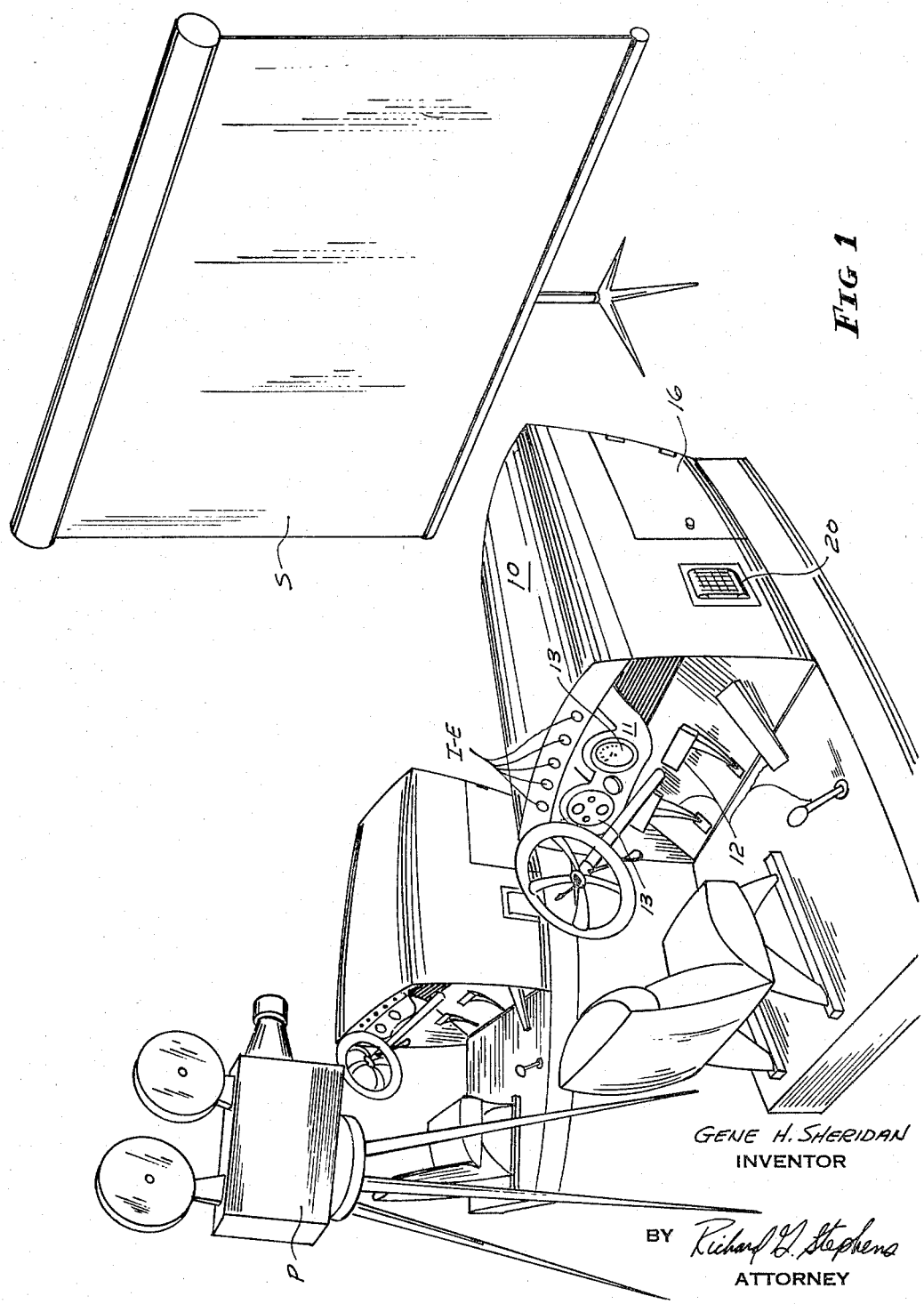

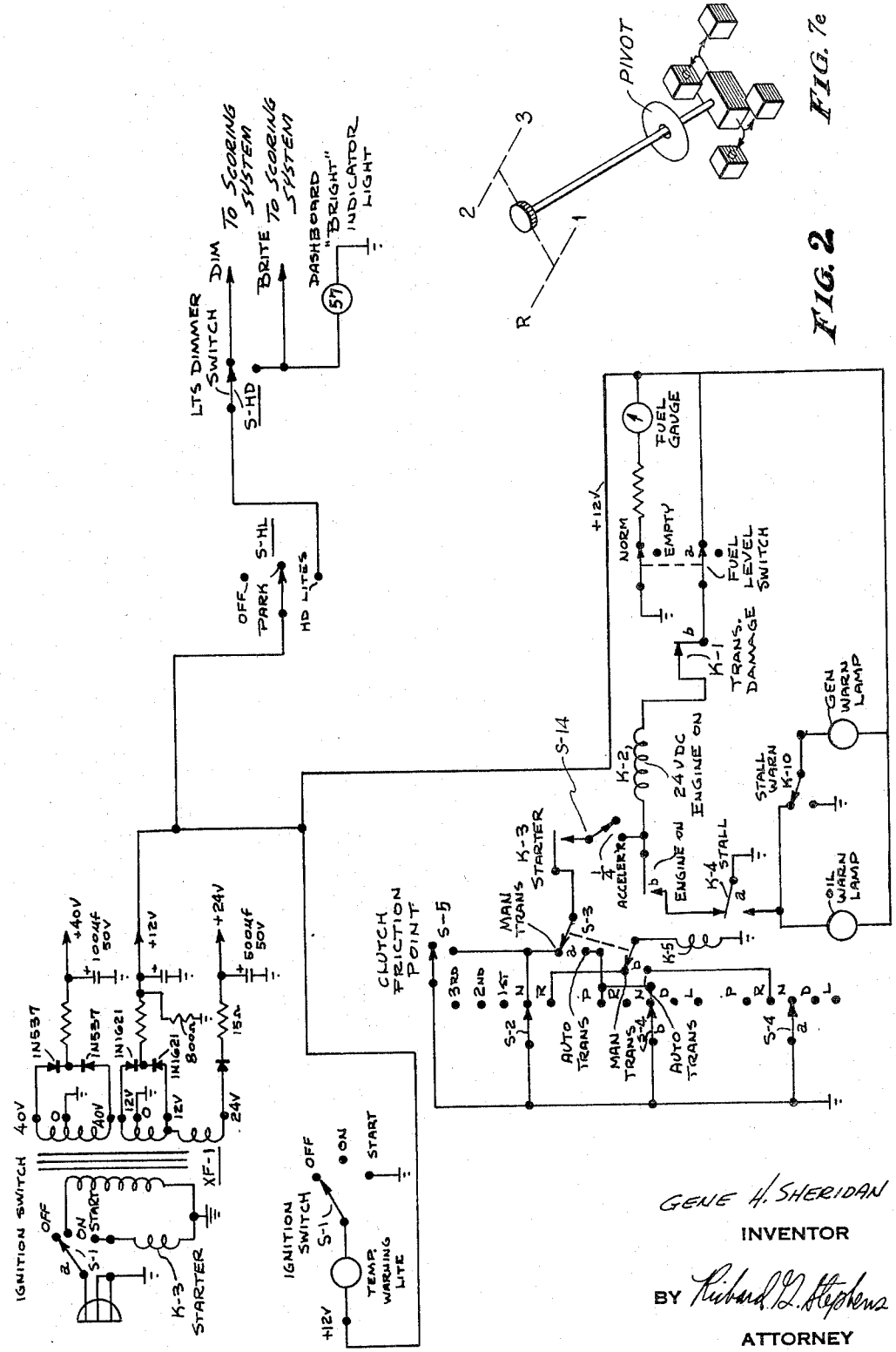

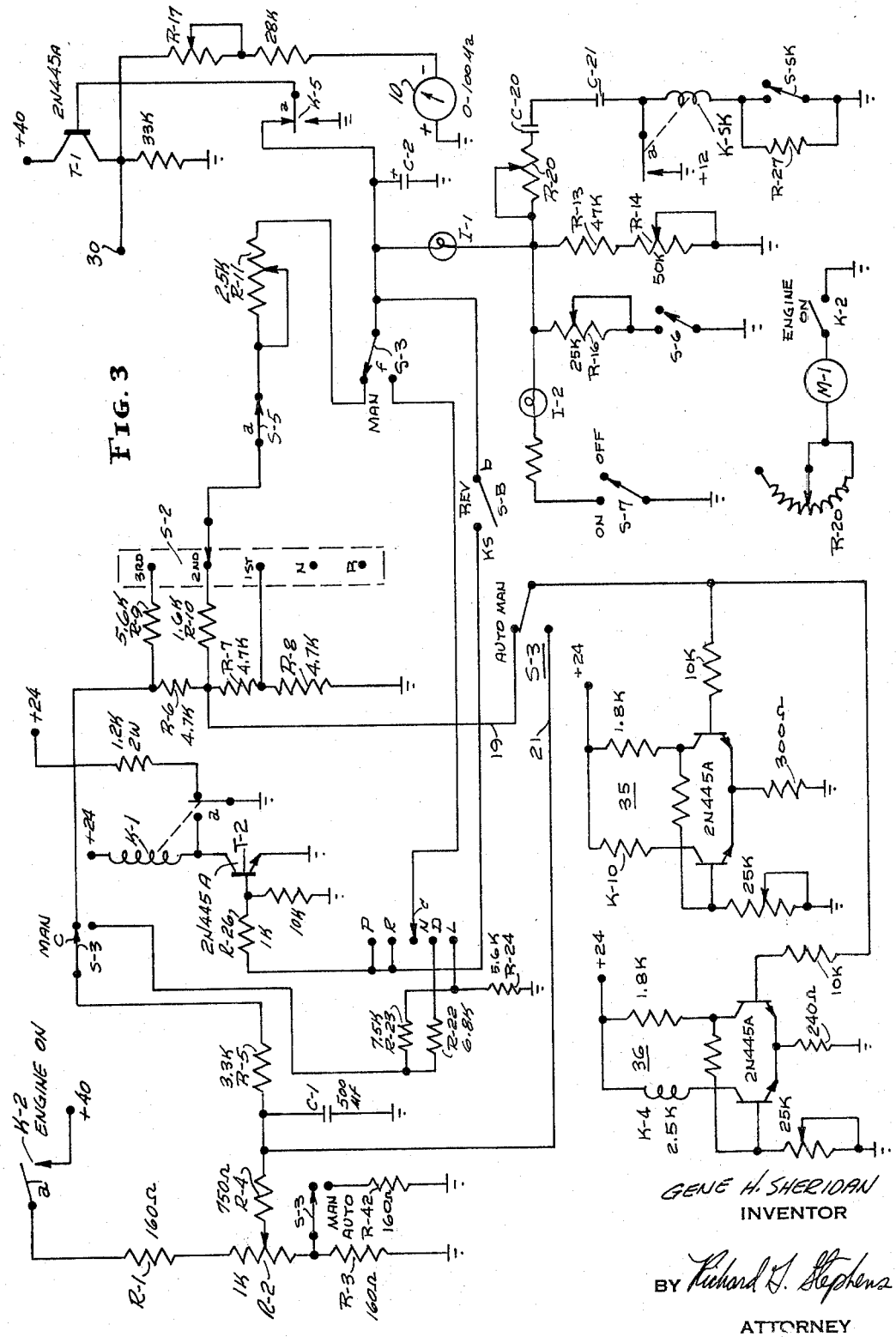

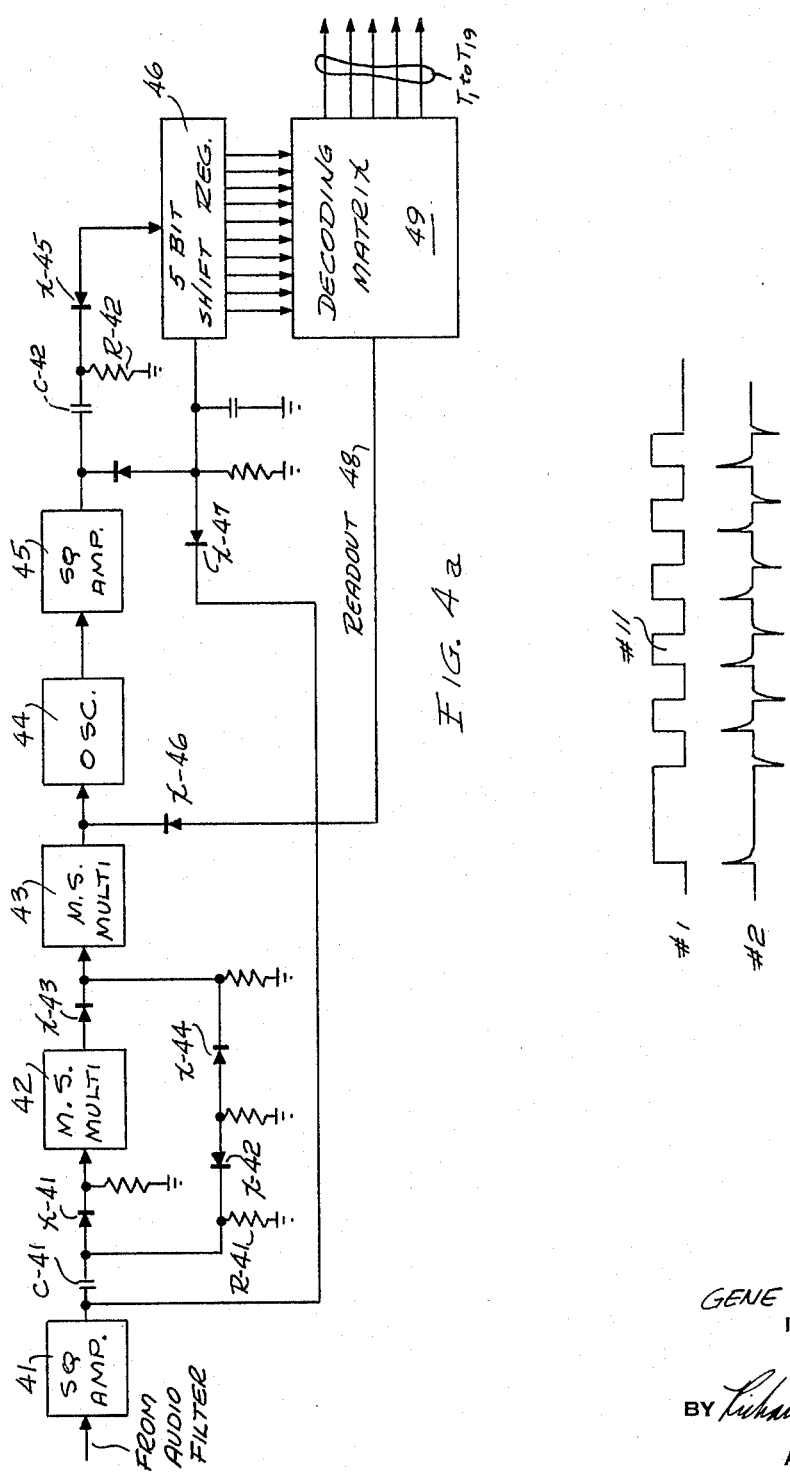

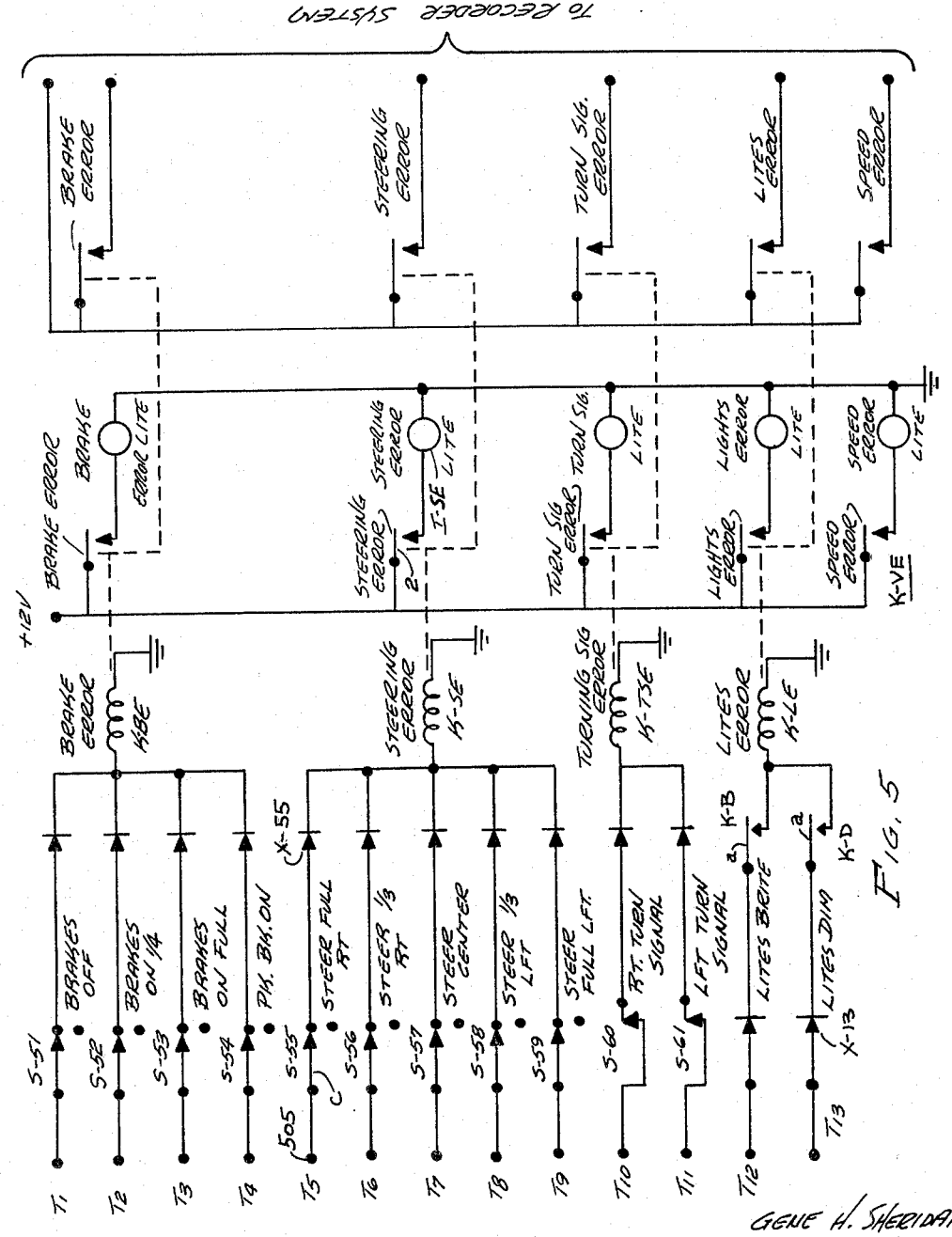

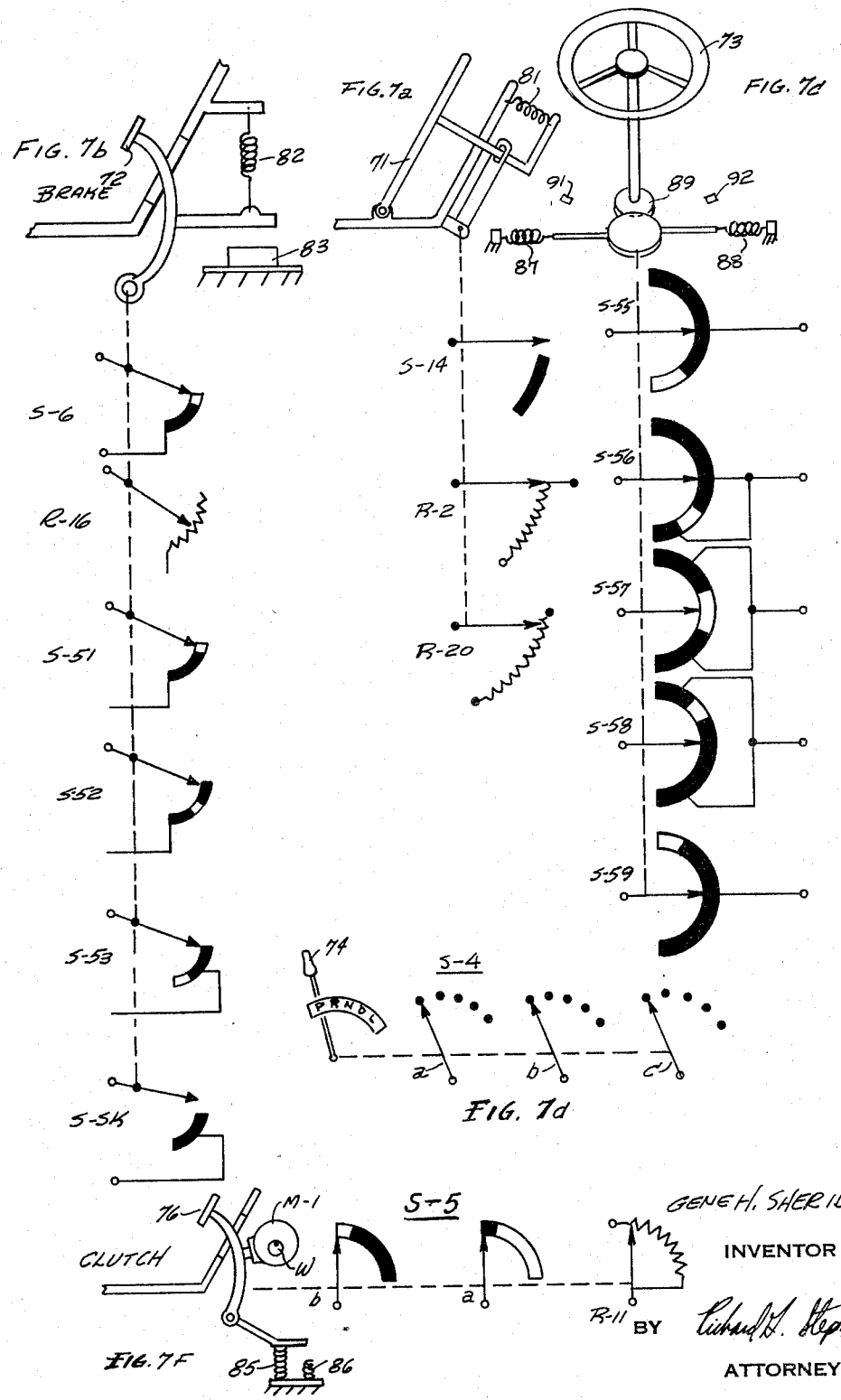

United States Patent Office 3,266,173
Patented August 16, 1966

3,266,173
TRAINING APPARATUS
Gene H. Sheridan, Woodland Hills, Calif., assignor to General Precision, Inc., Binghamton, N.Y., a corporation of Delaware
Continuation of application Ser. No. 180,428, Mar. 19, 1962. This application Jan. 10, 1964, Ser. No. 337,096
29 Claims. (Cl. 35—11)

This invention relates to automobile trainer apparatus, and in particular to improved apparatus for use in training students in proper automobile driving practices and this application is a continuation of my prior copending application Serial No. 180,428, filed March 19, 1962, and now abandoned. A variety of prior art auto trainers are described in the literature. Many of the prior art trainers utilizer mock-ups simulating the driver's station of an automobile provided with a plurality of dummy controls operable by a student to effect simulated automobile travel, and provided with a plurality of instruments simulating the dashboard instruments of an actual automobile. To provide increased realism and to determine student response to simulated emergencies and other situations which require certain driver responses, it has been common for many years to project visual displays, as by means of motion picture projectors, for example, for observation by students as they operate the dummy controls. The present invention centers around improvement of such training devices.

In order to achieve extensive use, a primary requisite of automobile trainers is that they be extremely economical to construct, as compared to flight simulators, for example. The much greater cost and relative unavailability of airplanes and the much greater danger to life in practicing flight emergencies in generally regarded as justifying the construction of extremely elaborate and expensive training devices, many of which currently sell for well over $1,000,000 each. If high schools and driver training schools are to afford driving training apparatus, the cost of a trainer must be near, perhaps, $1000. In order to provide maximum effective training, however, it is highly desirable that automobile driving trainers be as realistic as is possible, at as low a cost as possible. For example, it is highly desirable that an automobile trainer realistically respond to almost every type of student operation of the controls, whether the operation is proper or improper. Because automobile trainers of the prior art necessarily have been designed under stringent cost limitations, most of them of which I am aware have utilized simple electromechanical hardware and have made little or no attempt to provide continuous and accurate analog simulation. Thus it is a primary object of the invention to provide extremely realistic and relatively accurate analog simulation using extremely inexpensive circuitry.

It long has been common practice to test the response of student drivers to simulated special conditions, emergencies and impending dangers depicted in the projected visual display, by sensing or determining the condition of various of the controls at times during and after the emergency situations appear in the viewed display, and it is usual to score or grade student performance in accordance with the determined control conditions, a recorder frequently being utilized to record various control conditions to provide a permanent record for later analysis. The invention, though utilizing a motion picture projector having filmed emergency sequences and situations, does not record any individual control positions or conditions, but instead determines whether student action is proper or improper, and then indicates, (and records, if desired) only student *errors*, preferably indicating errors to the student at a time during which they exist, and recording errors so that a permanent record indicating all errors made during a simulated trip or exercise is available upon completion of the exercise. The invention also preferably does not record or indicate every distinct type of error made, but instead records and indicates "types" of errors, which results in much less, but more meaningful and more comprehensible indications and records.

Thus it is a primary object of the present invention to provide improved automobile driver training apparatus which more realistically simulates automobile operation by use of extremely simple and economical analog computer means.

It is an allied object of the invention to provide improved automobile driver training apparatus which detects and/or records student errors rather than individual dummy control positions.

Other objects of the invention will in part be obvious and will in part appear hereinafter.

The invention accordingly comprises the feature of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a view illustrating the general arrangement of a training device according to the present invention, partially in schematic form;

FIG. 2 is an electrical schematic diagram illustrating the simulated power, engine starting, and accessory system of the invention;

FIG. 3 is an electrical schematic diagram illustrating the engine, the acceleration and the velocity computer portions of the invention;

FIG. 4a is an electrical schematic diagram, partially in block form, illustrating means operated by the sound track of the training film for controlling certain error-detecting apparatus;

FIG. 4b is a waveform diagram useful in understanding operation of the apparatus of FIG. 4a;

FIG. 5 is an electrical schematic diagram illustrating a portion of the error-detecting apparatus of the invention;

FIG. 6 is an electrical schematic diagram illustrating further portion of the error-detecting apparatus of the invention;

FIGS. 7a–7f illustrate schematically how various of the dummy controls may be connected to operate various switches and potentiometers.

FIG. 1 illustrates the general arrangement of the invention. A mock-up 10 of an automobile driver's station is provided, with a plurality of simulated indicators 13, 13 such as a speedometer, a fuel gage, an oil pressure gage, a temperature gage and the like, mounted on a dashboard 11, and provided with a plurality of dummy controls 12, 12 for operation by the student as he views the scenes projected on screen S by motion picture projector P. Usually a plurality of trainers are utilized with a single projector so that a plurality of trainees may be educated simultaneously. Associated with each trainer is a power and computer cabinet 16, which contains apparatus to be described below. In addition to the usual indicators found in a conventional automobile, a plurality of "error signal lights" I–E are mounted so as to be visible by the student, and if desired, duplicate lights may also be connected in parallel with them and located at a central station, such as near the projector, for observation by the instructor. Each trainer also may be provided with an error recorder 20, or alternatively, the error recorders for an entire classroom of trainers may be combined into a single recorder at a central location. As will be made clear below, projection of a training film causes a series of tests to be made of the student's reactions, and errors which the students make may be recorded on a conventional recorder to provide permanent performance records. Since persons skilled in the art universally are familiar with the location and nature of operation of conventional automobile controls, and because the mechanical connection of similarly-shaped dummy controls to operate potentiometers, switches and the like is so simple and well known in the art, the precise mechanical details of such connections need not be shown herein. In order to enable use of the trainer for instruction in driving automobiles with both "standard" (manual) and "automatic" transmissions, the trainer may be provided with switching means which may be adjusted before the start of a training exercise to either a manual mode or an automatic mode. It will be apparent that parts utilized for only one mode or the other may be eliminated if one desires to simulate only one type of transmission.

The principal dummy controls provided in the trainer are the accelerator or "gas" pedal, the brake pedal, the steering wheel, the transmission shift lever, and the clutch if a manual transmission is simulated. As shown schematically in FIG. 7a, accelerator pedal 71 is mechanically connected to close the contact of switch S–14 whenever the accelerator is depressed one-fourth or more of its range of travel, and to position the wiper arm of potentiometers R–2 and R–20 continuously along the respective potentiometer windings as the accelerator pedal is depressed against the force of restoring spring 81. Brake pedal 72 is shown in FIG. 7b mechanically connected to close switch S–6 as the brake pedal is depressed approximately one-half inch, and to remain closed as the brake pedal is depressed further. Brake pedal 72 is also connected to position the wiper arm of potentiometer R–16 and connected to switch S–51 to close the switch whenever the pedal is depressed any appreciable amount, but to open switch S–51 when no pressure is exerted on the brake pedal. Pressure applied to brake pedal 72 is opposed by tension spring 82 during any of its travel, and by compression of rubber pad 83 after the pedal has been depressed a slight initial amount. Pad 83 begins to compress at a pedal deflection corresponding to the deflection at which the brake shoes in a conventional automobile seat against the brake drums. Similarly, switch S–52 is connected to be closed at all times except when approximately one-fourth maximum brake pedal pressure is applied, and switch S–53 is connected to be closed at all times except when a maximum pressure is applied to the pedal. Further, switch S–SK is closed upon the sudden depression of the brake pedal in a substantial amount to operate a skid relay K–SK as hereinafter more particularly described. Steering wheel 73 is shown in FIG. 7c connected to close switch S–55 except when the wheel is turned full right, to close switch S–56 except when the wheel is turned right to within a range centered about one-third maximum, to close switch S–57 except when the wheel is in substantially a center position, and to close switches S–58 and S–59 except during certain similar ranges of wheel deflection in the left direction. The simulated steering wheel turns against the force of centering springs 87, 88 through gearing 89. Wheel 73 is arranged to be capable of approximately 450 degrees rotation in either direction before striking stops 91, 92. The center band, during which switch S–57 is open covers approximately 90 degrees of wheel rotation, 45 degrees in either direction. Switches S–56 and S–58 are open between 45 to 135 degrees wheel rotation, and switches S–55 and S–59 are open at wheel deflections greater than 135 degrees from the centered position.

The automatic transmission shift lever 74 is shown in FIG. 7d mechanically connected to operate a three-deck selector switch S–4 having five contacts on each deck. The five contacts on each deck are contacted by their respective selector arm in a respective one of the five shift-lever positions of a conventional automatic transmission shift lever: "Parking," "Reverse," "Neutral," "Drive" and "Low." The manual transmission shift lever 75a is shown in FIG. 7e connected to operate a plurality of microswitches in each of the four driving positions of the shift lever, each microswitch being supplied with a double-pole switch having both NC and NO contacts. The NC contacts are wired in series to indicate the shift lever "neutral" position. The clutch pedal 76 used during manual transmission simulation is shown in FIG. 7f connected to open contact a and close contact b of switch S–5 as the clutch is depressed to or past a point representing clutch engagement, and to increase the resistance of rheostat R–11 as the clutch pedal is depressed. The clutch pedal operates against the force of two compression springs 85, 86, spring 86 not operating until the clutch has been depressed substantially. A small motor M–1 provided with an eccentric weight W on its shaft is mounted on the trainer clutch pedal to cause vibration which varies in accordance with simulated engine speed, as will be explained below. The invention is also equipped with switch S–7 (not shown) which is mechanically connected to be closed when a dummy hand brake control is adjusted to its "On" or parked position, and also equipped with further switches to be mentioned below.

The entire computer apparatus of FIGS. 2 and 3 may be connected to be operated by power from a power supply shown in FIG. 2. A line cord adapted to be plugged into an ordinary 120 volt outlet is connected through contact a of switch S–1 to energize the primary winding of a conventional step-down transformer XF–1. Switch S–1 preferably comprises a conventional key-operated automobile ignition switch having "off," "on," positions and a momentary "start" position, and the switch may be mounted on the trainer dashboard. As shown in FIG. 2, contact a of ignition switch S–1 will complete the circuit to energize transformer XF–1 in both the "on" and the start positions. In the "start" position the coil of starter relay K–3 is also energized. Energization of transformer XF–1 immediately provides voltages from the secondary windings of transformer XF–1, and in FIG. 2 although three separate low-voltage direct current sources are shown provided, it will be recognized that one or two sources could be provided instead, if desired. Each of the D.C. sources is shown as comprising one or more germanium diode rectifiers and a conventional low-pass filter circuit. It is desirable to connect the simulated ignition switch directly at the power input to the trainer so that a single switch contact is capable of turning off all power to the trainer, in a manner analogous to actual automobile operation. It is necessary for realism, however, that power be made available promptly when the ignition switch is turned to "on" or to "start," as a variety of indications occur promptly in an actual automobile as soon as the ignition switch is turned on, and therefore it is necessary that the rectifiers used in the power supplies not require appreciable "warmup time." While FIG. 2 illustrates an embodiment of the invention utilizing an ignition switch-operated starter contact to energize the coil of starter relay K–3, it should be recognized that a separate starter pushbutton switch may be substituted, or that an accelerator-operated switch contact may be substituted without departing from the invention. In FIG. 2 power is connected from terminal +12 via the normally-closed contact a of a "fuel level" switch, which may be adjusted by the instructor to either "normal" or "empty" positions, and thence via contact b of transmission damage relay K–1, the coil of "engine on" relay K–2 and then through one or the other of two branch circuits, one of which is utilized for simulated engine starting, and the other of which is energized after starting, while the simulated engine is running. The starting branch circuit includes switch S–14 operated by the trainer accelerator pedal to close whenever the pedal is depressed one-fourth or more of its travel (FIG. 7a), normally open contact b of the starter relay K–3 and a transmission mode switching circuit S–3. If it is desired to simulate an automobile having a manual transmission, switch S–3 will be positioned as shown in FIG. 2, connecting contact b of starter relay K–3 to ground either through a clutch-operated switch contact b of switch S–5 (FIG. 7f) or through gear shift lever operated switch S–2 to ground. Thus, during manual transmission simulation, when the student turns the ignition key switch S–1 to the "start" position, energization of the coil of starter relay K–3 closes contact b, energizing "engine on" relay K–2 if normal fuel conditions prevail, if the NC (normally closed) transmission damage relay contact b of relay K–1 has not been operated, if the accelerator is depressed at least one-fourth, and if either the clutch is depressed or the shift lever is in neutral position. Thus the student is unable to start the simulated engine unless he either has adjusted the shift lever to neutral or has depressed the clutch, and only if he remembers to depress the accelerator pedal down slightly. If instead, automatic transmission simulation is desired, and switch S–3 is adjusted opposite from the position shown, it will be seen that the automatic transmission lever must be in either the "parking" or the "neutral" position in order to start the simulated car and energize "engine on" relay K–2. Once the coil of "engine on" relay K–2 is energized, it closes its holding contact b, which is connected to ground through normally-closed contact a of stall relay K–4, thereby maintaining "engine on" relay K–2 energized even after the ignition key is retracted from its "start" position to its "on" position, unless stall relay K–4 is operated, as will be explained below. Accelerator-operated rheostat R–20 is connected in series with motor M–1, as shown in FIG. 3, to vary the frequency and amplitude of the vibrations felt and heard by the student, so that motor M–1 speeds up as the simulated accelerator pedal is depressed. An additional contact of "engine on" relay K–2 is provided to disable motor M–1 when the simulated engine is not running. It will also be seen in FIG. 2, that turning the key-operated ignition switch S–1 to "off" will turn off the 12 volt power and return "engine on" relay K–2 to its deenergized position.

Referring now to FIG. 3, closure of contact a of "engine on" relay K–2 applies a direct voltage via resistor R–1 to excite potentiometer R–2, the wiper arm of which is mechanically connected to be operated by the accelerator pedal as shown in FIG. 7a, deriving a voltage which is applied to an integrating network shown as comprising resistor R–4 and capacitor C–1. This integrating RC combination provides a delay simulating the lag between accelerator pedal operation and engine speed. The output voltage from the integrating network is applied via resistor R–5 to contact c of the transmission mode selector switch S–3. When manual transmission simulation is being effected, the engine speed analog voltage is applied across a voltage divider network shown as comprising resistors R–6, R–7 and R–8, the taps of which are connected to individual contacts of manual gear shift lever-operated switch S–2. If the shift lever is in one of its forward speed positions, the voltage from its associated voltage divider tap is applied, as soon as the clutch pedal is released as far or further than its engagement point, through contact a of switch S–5, rheostat R–11 and contact f of switch S–3 to a further integrating device shown as including capacitor C–2. The scaling resistance between the engine speed analog voltage and capacitor C–2 is arranged, by selection of resistances R–9 and R–10 with relation to the taps of the voltage divider, so that the voltage applied to capacitor C–2 simulates the acceleration of the automobile. A given engine speed analog voltage will be seen to charge capacitor C–2 at a higher rate if the car is in 3rd gear than if it is in first gear or second gear, since a greater proportion of the voltage across the voltage divider will be applied to the capacitor. The scaling resistances R–9 and R–10 determine the time constant of the integration, however, with higher gear positions providing a longer time constant, so that it takes longer to accelerate the simulated car in high gear than in low gear, just as in an actual automobile. The voltage across capacitor C–2 is applied via normally closed contact a of reverse relay K–5, which is closed unless the car transmission is set to "reverse," to the base electrode of transistor T–1, which is connected as a conventional emitter follower, to present a high load impedance and thus avoid loading down the C–2 integrating circuit. The output voltage from the emitter of T–1 is connected through an adjustable calibrating resistance R–17 to operate a conventional d'Arsonval meter movement adapted to simulate a conventional automobile speedometer 10. The velocity analog voltage is also applied via terminal 30 to the trainer scoring system, for a purpose to be explained below.

Connected in parallel with integrating capacitor C–2 are a plurality of circuits arranged to discharge capacitor C–2 to simulate friction and braking forces. A non-linear resistance shown as comprising a simple incandescent bulb I–1, by way of example, is connected to apply the simulated velocity voltage across a resistance including resistors R–13 and R–14, which drain capacitor C–2 to simulate friction and tire and aerodynamic drags and like effects. If the simulated car is proceeding at a given velocity and then shifted to neutral, or the engine shut off, or the clutch disengaged, the voltage across capacitor C–2 will be gradually discharged, simulating coasting to a stop. The voltage from resistance I–1 is also connected through a brake pedal-operated resistance R–16 and brake-pedal operated switch S–6. Switch S–6 closes whenever the brake pedal is depressed slightly to the point where simulated braking begins, as shown in FIG. 7b, and then the resistance of potentiometer R–16 is decreased as additional brake pedal pressure is exerted, thereby discharging capacitor C–2 at an increasing rate. The voltage from resistance I–1 is also connected via a further non-linear resistance I–2 and through a parking brake switch S–7 to ground. If the parking brake is "on," closure of the contacts of switch S–7 connects capacitor C–2 to ground through such a low impedance that no appreciable voltage can build up across capacitor C–2 and hence no appreciable simulated velocity can result. Resistances I–1 and I–2 are preferably made non-linear to tend to compensate for the non-linear discharge characteristics of capacitor C–2. Optionally, the speed voltage applied through resistance I–1 also may be connected via brake pedal-operated rheostat R–20 and capacitors C–20, C–21 through a series circuit including skid relay K–SK and brake-pedal operated switch S–SK. Assuming that the simulated car has appreciable velocity, the sudden depression of the brake pedal in a substantial amount will be seen to apply a transient voltage through capacitors C–20, C–21 to operate skid relay K–SK, which relay, once operated, closes its holding contact a and remains operated unless and until the student discontinues simulated braking by opening switch S–SK. Skid relay K–SK may be provided with additional contacts (not shown) to operate a desired indicator, such as a lamp, and to connect an error signal to a recorder. Resistor R–27 may be made variable to adjust the point at which relay K–SK operates and thus provide proper instruction for driving on slippery or dry streets.

When automatic transmission simulation is to be effected, contact c of switch S–3 connects the output of the engine integrating network to a different voltage divider arrangement comprising resistors R–22 to R–24. The operation of the automatic transmission lever to select either "drive" or "low" operates to select the scale factor and the time constant of the voltage applied to capacitor C-2, in a manner analogous to that explained above for normal transmission simulation. Since automatic transmission driving does not involve clutch operation, the voltage selected from resistor R-23 or R-22 is applied directly to capacitor C-2 without any intervening clutch-operated circuit. When automatic transmission simulation is simulated, a contact of switch S-3 connects resistor R-42 in parallel with resistor R-3 to alter the voltage on the wiper of potentiometer R-1, R-2. Resistances R-2, R-3 and R-42 are proportioned so that the voltage on the wiper arm of potentiometer R-2 when the accelerator is not depressed represents an "idling speed" at which the simulated automobile tends to "creep" slightly, thereby requiring that the student apply braking if creeping is to be avoided.

Because operation of an automatic transmission shift lever to "parking" or "reverse" during a condition of appreciable forward speed usually causes serious damage to the transmission, it is important to detect any such student error. If the lever is operated in such a manner in the invention, the voltage across capacitor C-2 will be seen to be applied via contact $f$ of switch S-3, contact $c$ of switch S-4, and resistor R-26 to the base of transistor T-2, causing the transistor to conduct and thereby energize the coil of transmission damage relay K-1. Energization of relay K-1 operates its holding contact $a$, thereby maintaining relay K-1 operated, and also opens its NC contact $b$ (FIG. 2), thereby disabling the engine and preventing it from being re-started in view of the gravity of such an error. Only by turning the ignition key completely off will relay K-8 be deenergized so that the simulated car can be started again. If desired, a further contact (not shown) may be provided on relay K-1 to operate an alarm. Also, the contact $b$ of the K-5 reverse relay may be arranged to connect the velocity voltage to operate transistor T-2 in similar fashion, to indicate comparable erroneous operation during manual transmission driving.

When manual transmission operation is simulated, a voltage from the junction between resistors R-6 and R-7 is routed via conductor 19 to be applied to first and second level-detecting and switching circuits shown as comprising transistor Schmitt-trigger circuits 35, 36. The voltage is sampled from between the engine integrating network and the acceleration integrating network and represents engine speed. If either the accelerator is sufficiently depressed and capacitor C-1 sufficiently charged up to indicate sufficient engine speed, or if capacitor C-2 is sufficiently charged up to indicate appreciable forward velocity, the voltage on conductor 19 will remain above a given level, and neither trigger circuit will be operated. If, however, the simulated car is standing still with its engine running, so that zero voltage exists across capacitor C-2 and then the student ceases to depress the accelerator, the voltage across C-1 will decrease, as C-1 tends to discharge through the voltage divider (R-6, R-7, R-8). When the voltage on conductor 19 falls below a first predetermined value, Schmitt trigger circuit 35 will be operated, energizing stall warning relay K-10, and if the voltage continues to fall below a second predetermined level, trigger circuit 36 will be operated, energizing stall relay K-4. As shown in FIG. 2, energization of stall warning relay K-10 energizes the "generator" warning light, and energization of stall relay K-4 disables "engine on" relay K-2, simulating stalling of the the engine, and illuminating the "oil" and "generator" warning lamps on the dashboard, stall warning relay K-11 always being operated if stall relay K-4 is operated.

During manual transmission simulation it will be seen that the voltage across engine speed capacitor C-1 is connected through clutch pedal-operated resistance R-11 to capacitor C-2 when the clutch pedal is released. If the simulated car has no forward velocity the voltage across capacitor C-2 will be zero. Release of the clutch pedal under such conditions will be seen to connect uncharged capacitor C-2 through certain resistances to C-1, which will tend to discharge capacitor C-1 as capacitor C-2 charges up. If the clutch pedal is released rapidly, so that resistance R-11 is immediately adjusted to a low value, the voltage applied to the trigger circuits will fall rapidly. If instead the clutch pedal is released gradually, the voltage on conductor 19 will fall less rapidly, or perhaps not at all. Thus it will be seen that the stall circuits detect improper clutch pedal operation which would result in a stall. It should be noted also that the effect of clutch pedal operation on the voltage sensed by the trigger circuits also properly depends upon which gear the student has selected with the gear shift lever.

If the student is traveling at a substantial simulated velocity, so that capacitor C-2 is charged up to a high value, and he then declutches and releases the accelerator, it will be seen that capacitor C-2 will begin to discharge slowly through the friction and drag circuit (R-13, R-14) and the capacitor C-1 will discharge through the voltage divider (R-2 and R-3), at a considerably faster rate due to the lower impedance of the voltage divider. After a few seconds of such simulated "free-wheeling," capacitor C-2 will have a higher voltage across it than capacitor C-1, and if the student then re-engages the clutch, current will flow from capacitor C-2 through the then selected voltage divider tap to charge up C-1, raising the simulated engine speed and decreasing the simulated vehicle velocity, just as such a procedure would accomplish in an actual automobile. This backward flow of current from capacitor C-2 to capacitor C-1 will be seen to be governed by the selected gear shift position, because the level to which simulated engine speed is raised depends upon which scaling resistor connects C-2 to C-1. In third gear a greater portion of the voltage across C-2 is connected to C-1 through impedance (R-9) than in second gear (R-10), so that automobile inertial velocity will raise engine speed more quickly, and consequently decrease automobile velocity more quickly if the car is in second gear rather than third gear. It will be seen that the transmission switch and voltage divider combination and the clutch-operated switch and rheostat interconnect capacitors C-1 and C-2 and govern the transfer of charge between the capacitors, in a manner analogous to that in which the transmission and clutch in a conventional automobile govern the transfer of momentum between the engine and the mass of the automobile. It may be noted that in the invention the single connection between capacitors C-1 and C-2 will allow the charge to flow in either direction, while most analog computing devices which utilize cascaded integrating circuits interconnect such circuits by unidirectionally conducting devices, necessitating considerably more elaborate circuitry to provide the many functions simulated by the simple circuitry of FIG. 3.

The computer apparatus of FIGS. 2 and 3 also may be used in conjunction with various other known visual display means of the type requiring a simulated velocity signal in those arrangements where a single trainer is connected to control a visual display.

The projector which provides the visual display to be seen by the students is provided with conventional sound pickup means, such as a photocell which provides electrical signals in accordance with the character of pulses recorded on the "sound track" of the film. In the invention, pulses are coded in the sound track to provide five-digit serial binary numbers. Each series of coded pulses is preceded by a synchronizing pulse which signals the advent of a serial train of pulses. By providing "pulses" and "no pulses" during the five-digit times of the signal period, a serial binary number will be seen to result. FIG. 4b shows as waveform #1 a synchronizing pulse followed by five signal pulses, indicating the binary number "11111" or, 32 in decimal form. If no pulse were recorded in the position of pulse #1 in FIG. 4a, for example, the binary number would instead be "10111" or 24 in decimal form. The serial binary numbers read from the film sound track are converted to parallel binary form by the apparatus shown in FIG. 4a, and then decoded to energize selectively one of a group of output conductors. For example, if the binary number "six" is encoded at a given place on the film, conductor number 6 of the output conductor group will be energized as the place on the film passes through the projector.

The photocell output from the projector sound detector is applied through a band pass filter, centered at 5 kc., for example, and then to a squaring amplifier 41, which reshapes the pulses to a uniform height. The pulses are differentiated by means of resistor R–41 and capacitor C–41 to provide waveform #2 as shown in FIG. 4b. The positive-going spikes are applied via diode X–41 to a 3-millisecond monostable multivibrator 42, and the negative-going spikes are applied by means of diode X–42 to an "and" gate comprising diodes X–43 and X–44. The first incoming positive-going pulse edge sets multivibrator 42, providing a positive voltage therefrom for 3 milliseconds. If a negative-going spike occurs before multivibrator 42 resets, diode X–44 will be cut off, but diode X–43 will be conducting, preventing application of a signal to a 20 millisecond monostable multivibrator 43. Thus the circuit will not trigger multivibrator 43 until a pulse at least 3 milliseconds in duration (or longer) is received. When the synchronizing pulse eventually arrives, however, multivibrator 42 will be set by its leading edge and then will automatically reset itself before the end of the synchronizing pulse, so that occurrence of the synchronizing pulse trailing edge will cut off both diodes X–42 and X–44 and provide a negative pulse to multivibrator 43. Multivibrator 43 provides a 20-millisecond output pulse whenever triggered by the "and" gate output signal. The 20-millisecond output pulse gates on a 250 c.p.s. oscillator 44, which will be seen to produce five cycles of output signal during the 20-millisecond period. The five cycles of oscillator output are squared by amplifier 45, differentiated by capacitor C–42 and resistor R–42, and the negative spikes therefrom applied to shift a conventional 5-bit shift register 46. The negative-going trailing edge of the 20-millisecond output signal from multivibrator 43 is connected via diode X–46 to operate the readout line 48 of a decoding matrix 49 to be further explained below. It will be seen that every time a synchronizing pulse is applied, shift register 46 will be shifted through all five of its stages. The input signal from squaring amplifier 41 is also applied as shown via diode X–47 to the input line of shift register 46. Upon completion of the 20-millisecond sampling period, it will be seen that the last five input pulses to have been applied from amplifier 41 will be stored in shift register 46, and the occurrence of the readout pulse on line 48 at the end of the sampling period now will be seen to apply a parallel five-digit binary-coded number to decoding matrix 49. Decoding matrix 49 receives the five digit binary signal and energizes a selected output conductor depending upon the binary number read from shift register 46.

In the specific embodiment shown, nineteen different and separate operating conditions of the simulated car are sensed to determine whether or not student action is correct, and hence nineteen different binary numbers are coded on films to be used with the device, for the purpose of indicating which operating condition should be checked, and an extra number may be used to indicate that no condition is being checked. It will be apparent that more or less tests than 19 may be utilized, and the particular five-digit shift register shown would allow up to 32 different tests to be made. When a given binary number is encoded on the film and read by the apparatus of FIG. 4a, a selected output wire of the decoding matrix is energized. For example, the binary number "five" may be coded on the film with a scene or sequence which demands that the student steer full to the right. Upon decoding the binary number, matrix 49 will energize its output conductor No. 5 thereby applying a voltage to terminal 505 of FIG. 5. If the student is steering full to the right at the time terminal 505 is energized, contact c of switch S–55 will be open and no signal will be applied to diode X–55 or relay K–SE. If, however, the student is not steering full to the right at the time terminal 505 is energized, contact c of switch S–55 will be closed, and an error signal will be applied through diode X–55 to energize steering error relay K–SE. Energization of relay K–SE closes its contact 2, illuminating steering error indicating light I–SE. Contact c of switch S–55 is operated by the trainer steering wheel to be closed at all steering wheel positions except full right. A feature of the invention is that only errors are sensed rather than control positions or conditions themselves, which results in no output indications if the student performs perfectly. Ten additional output conductors from matrix 49 are shown connected through respective contacts (which may be switch-operated or relay-operated), to operate either a braking error relay K–BE, steering error relay K–SE, or turn signal error relay K–TSE. Contacts S–51, S–52 and S–53 are operated by operation of the brake pedal, and contact S–54 is operated by the hand brake. Contacts S–55 to S–59 are operated by the steering wheel, and contacts S–60 and S–61 are operated by the turn signal switch via relays K–15 and K–16 (FIG. 2).

Since monitoring of a student's simulated speed is considered important, the invention includes means for detecting speed errors. By coding a binary number from 14 to 19 on the film, the associated output conductor of decoder 49 will be energized, thereby energizing a respective relay of the group K–S14 to K–S19 shown in FIG. 6, and thereby energizing "speed test enable" conductor 76 by closing one of the a contacts of relays K–S14 to K–S19. Closure of one of the b contacts of relays of the group K–S14 to K–S19 connects a selected voltage from a voltage divider via a complementary pair of emitter follower transistors T–13 and T–14, to the emitter of transistor T–15, the base of which is connected via resistor R–68 and terminal 30 to receive the simulated car velocity voltage generated as shown in FIG. 3. If the simulated automobile velocity does not exceed the instantaneous maximum permissible velocity, the voltage on the T–15 emitter will exceed that on the T–15 base, thereby cutting off both transistor T–15 and transistor T–16. If the student is driving at a greater than permissible velocity, transistors T–15 and T–16 will conduct, and speed error relay K–VE will be energized, illuminating its associated indicating light.

A foot-operated headlight dimmer switch S–HD is shown connected to power through a headlight switch S–HL and to energize "dim" in FIG. 2 "bright" relays K–D and K–B of FIG. 6. If the binary number "13" is coded on the film, thereby energizing the No. 13 output conductor of decoding matrix 49, a signal will be applied via diode X–13 and contact a of relay K–D (see FIG. 5) to energize lights error relay K–LE unless the student has properly dimmed the headlights by his operation of switch S–HD. Relay K–B is arranged analogously to indicate intervals when the student may erroneously neglect to switch the simulated headlights to "bright."

As shown, further contacts on each error relay are provided to provide inputs to any desired recorders, which recorders may be advanced by the output of multivibrator 43 (FIG. 4b).

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Automobile training apparatus, comprising, in combination: a student's station having a simulated accelerator pedal and a simulated transmission shift control; engine computer means including a capacitor and a first potentiometer connected to be excited by a direct voltage and positioned by said simulated accelerator pedal for deriving a first potential; an electrical potential integrating network; an electrical signal scaling network including a plurality of signal paths having different resistances and a selector switch connected to individually select said signal paths, said selector switch being connected to be opertaed by said simulated transmission shift control; first circuit means connecting said first potential to said scaling network to allow current flow in either direction between said engine computer means and said signal scaling network; and second circuit means for connecting the selected path of said scaling network to said potential integrating network thereby to provide an output potential commensurate with simulated speed of a simulated automobile.

2. Apparatus according to claim 1 having a simulated brake pedal and a variable resistance circuit means connected to discharge said integrating network, said further potentiometer being mechanically connected to be operated by said simulated brake pedal.

3. Apparatus according to claim 1 having means for sensing the magnitude of said first potential, and relay means connected to be operated if said first potential falls below a predetermined value.

4. Apparatus according to claim 1 in which said simulated transmission shift control simulates an automatic transmission shift lever, in which said signal scaling network includes a voltage divider having a plurality of taps, and in which each of said signal paths comprises one of said resistances, each of said resistances being connected between a respective one of said taps of said voltage divider and a respective contact of said selector switch.

5. Apparatus according to claim 1 in which said simulated transmission shift control simulates a manual transmission shift control; said apparatus including a simulated clutch pedal, said circuit means including means connected to be adjusted by operation of said clutch pedal to control the application of said first potential to said integrating network.

6. Automobile training apparatus, comprising in combination: a first integrating network for receiving input signals commensurate with torques affecting a simulated automobile engine and for integrating said signals with respect to time to provide a second potential commensurate with simulated engine speed; first potentiometer means connected to be excited by a direct voltage and positioned by a simulated accelerator pedal to apply a first potential to said integrating network to provide said second potential; a voltage-divider connected to be excited by said second potential, said voltage divider having a plurality of taps; a simulated transmission shift control; a selector switch having a plurality of contacts connected to said taps and a selector arm connected to be switched to said taps in accordance with a simulated transmission shift control position to provide a third potential; a second integrating network; circuit means connecting said third potential to said second integrating network; and a simulated speedometer instrument connected to be operated by the output voltage from said second integrating network.

7. Apparatus according to claim 6 having a simulated brake pedal and a variable resistance connected to discharge said second integrating network, said variable resistance being mechanically connected to be adjusted by said simulated brake pedal.

8. Apparatus according to claim 6 having means for sensing the magnitude of said second potential, and relay means connected to be operated if said second potential falls below a predetermined value.

9. Apparatus according to claim 6 in which said contacts are connected to said taps through differently scaled resistances.

10. Apparatus according to claim 6 in which said simulated transmission shift control simulates an automatic transmission shift control and in which said circuit means connects said selector arm to said second integrating network.

11. Apparatus according to claim 6 in which said simulated transmission shift control simulates a manual transmission shift control and in which said circuit means includes a second potentiometer connected between said third potential and said second integrating network; and a simulated clutch pedal, said second potentiometer being connected to be adjusted by operation of said clutch pedal.

12. Apparatus according to claim 7 having a further impedance connected to discharge said second integrating network; a simulated hand brake control and a switch connected to be operated by said hand brake control; said further impedance being connected to said second integrating network through said switch.

13. Apparatus according to claim 6 having voltage-sensing means and in which said selector switch has at least one additional contact connected to said voltage-sensing means, and relay means connected to be operated by said voltage-sensing means to provide an error signal indicating damage to the simulated transmission.

14. Apparatus according to claim 6 having a relay provided with an operating coil and a pair of contacts, said direct voltage being connected to said first potentiometer through said pair of contacts; and first and second branch circuits connected to energize said operating coil, each of said branch circuits including in series a plurality of switch contacts, the switch contacts of said first branch circuit including contacts connected to be operated by a plurality of controls to energize said operating coil when said control are in predetermined positions, and the switch contacts of said second branch circuit including a contact connected to be opened upon simulated stalling of the simulated engine of said automobile training apparatus.

15. Apparatus according to claim 6 having relay means, capacitor means, and a second potentiometer and a second switch connected to be operated by a simulated brake pedal, said output voltage being connected through said second potentiometer and said capacitor means to operate said relay to provide a skidding signal, said relay means being provided with a holding contact connected to maintain said relay means operated and said second switch being operable to deenergize said relay means upon release of said simulated brake pedal.

16. Automobile training apparatus, comprising, in combination a student's station having a simulated accelerator pedal and a simulated transmission shift control; engine computer means including a first potentiometer connected to be excited by a direct voltage and positioned by said simulated accelerator pedal for deriving a first potential; an electrical potential integrating network; an electrical signal scaling network having a plurality of signal paths having different resistances and a selector switch connected to individually selected said signal paths, said selector switch being connected to be operated by said simulated transmission shift lever; first circuit means connecting said first potential to said scaling network; and second circuit means for connecting the selected path of said scaling network to said potential integrating network, thereby to provide an output potential commensurate with simulated speed of a simulated automobile; projector means for providing a succession of stimuli for observation from said student's station; means synchronized with said projector means for providing a succession of further signal potentials; means for comparing the magnitude of said output potential successively with the magnitudes of each of said further signal potentials; and indicating means responsive to said means for comparing for indicating whenever said output potential exceeds any of said succession of further signal potentials in magnitude.

17. Automobile training apparatus, comprising, in combination: a student's station having a simulated accelerator pedal and a simulated transmission shift control; a resistance-capacitance potential integrating network; means operated by said accelerator pedal and said control for providing a potential; first circuit means for applying said potential to said integrating network; a simulated brake control; and second circuit means connected to discharge said integrating network, said second circuit means including a first resistance having a non-linear voltage-current characteristic and a variable second resistance, said second resistance being mechanically connected to be adjusted by operation of said simulated brake control, said non-linear characteristic of said first resistance serving to linearize the discharge of said integrating network.

18. Apparatus according to claim 17 in which said first resistance comprises an incandescent lamp.

19. Automobile training apparatus, comprising, in combination: a student's station having a plurality of controls simulating those of an automobile;
film projector means for displaying discrete sequences of visual stimulus information to said student's station from film means having recorded thereon at selected intervals along its length encoded groups of pulses, each group corresponding to the desired operation of a certain one or a certain group of said controls during the display of each said discrete sequence;
decoding means having a plurality of output conductors responsive to said pulse groups for energizing respective ones of said output conductors associated with respective of said pulse groups;
and circuit means including switch means and error indicator means operatively coupled to each of said output conductors, each of said switch means being operatively coupled to certain ones of said simulated controls, whereby the desired operation of said controls actuates said switch means when the latter's output conductor is energized to inhibit operation of said error indicator means.

20. Apparatus according to claim 19 in which each of said groups of pulses comprises a serial binary pulse train; and in which said apparatus includes means responsive to serial binary pulse trains for converting said trains into parallel binary signals; and circuit means for applying said parallel binary signals to said decoding means.

21. Apparatus according to claim 19 having means responsive to operation of said controls for providing a voltage commensurate with simulated automobile speed; means connected to one of said output conductors for deriving a second voltage commensurate with a maximum permissible speed; and indicating means responsive to said voltages for providing an indication if said simulated speed exceeds maximum permisssible speed.

22. Apparatus according to claim 19 in which said error indicator means includes a plurality of indicating lights and is located at said student's station generally in front of said student to be observable by said student in the same general direction as said display produced by said film projector means.

23. Automobile driver training apparatus, comprising, in combination: a plurality of simulated automobile driver stations for simultaneously training a plurality of students, each of said stations including a respective plurality of simulated controls operable by a student; motion picture projection means for providing a sequence of scenes capable of being viewed simultaneously from each of said stations; means for generating a sequence of different electrical signals in timed relation to the provision of said sequence of scenes, each of said electrical signals being coded to correspond to a desired operation of one or more of said simulated controls; a group of error-indicating means individual to each of said stations and visible by the student at each respective station, each of the error-indicating means in each group being associated with a respective class of error, each said class of error being associated with mis-operation of one or a selected group of said controls; and means associated with each station, responsive to the operation of the controls at said station and responsive to the one of the electrical signals generated at a given time, for comparing the operation of a selected one or a selected group of said controls with the desired operation associated with said coded electrical signal, and for operating said error-indicating means corresponding to said mis-operated one or selected group of controls.

24. Apparatus according to claim 23 in which at least one of said electrical signals is coded to require a desired instantaneous position of a predetermined one of said controls at said given time in order to avoid operating said error-indicating means.

25. Apparatus according to claim 23 in which at least one of said electrical signals is coded to require a desired simulated condition corresponding to a predetermined history of operation of one or more of said controls prior to said given time in order to avoid operating said error-indicating means.

26. Apparatus according to claim 23 having a further error-indicating means at each of said stations; and means responsive to operation of one or more of said controls but independent of said sequence of different electrical signals for actuating said further error-indicating means.

27. Apparatus according to claim 23 in which the last-stated means includes means for providing error output signals and recorder means for recording said error output signals.

28. Apparatus according to claim 23 in which said different electrical signals comprise serial pulse trains, and in which the last-recited means includes: means for converting each such serial pulse train to a respective first parallel digital signal; a plurality of switch means connected to said one or selected group of controls for providing a second parallel digital signal; and means for comparing said first and second digital signals to provide an error signal for selectively operating said error-indicating means.

29. Apparatus according to claim 28 in which said means for converting includes a digital shift register means.

References Cited by the Examiner
UNITED STATES PATENTS

| | | | |
|---|---|---|---|
| 2,700,227 | 1/1955 | Arkell et al. | 35—11 |
| 2,731,631 | 1/1956 | Spaulding | 340—347 |
| 2,742,714 | 4/1956 | Allgaier | 35—11 |
| 3,015,169 | 1/1962 | Chedister et al. | 35—11 |
| 3,100,351 | 8/1963 | Priednieks et al. | 35—6 |
| 3,154,864 | 11/1964 | Jazbutis | 35—11 |

EUGENE R. CAPOZIO, *Primary Examiner.*

LAWRENCE CHARLES, LEONARD W. VARNER,
*Examiners.*

S. M. BENDER, *Assistant Examiner.*